Figure 1:
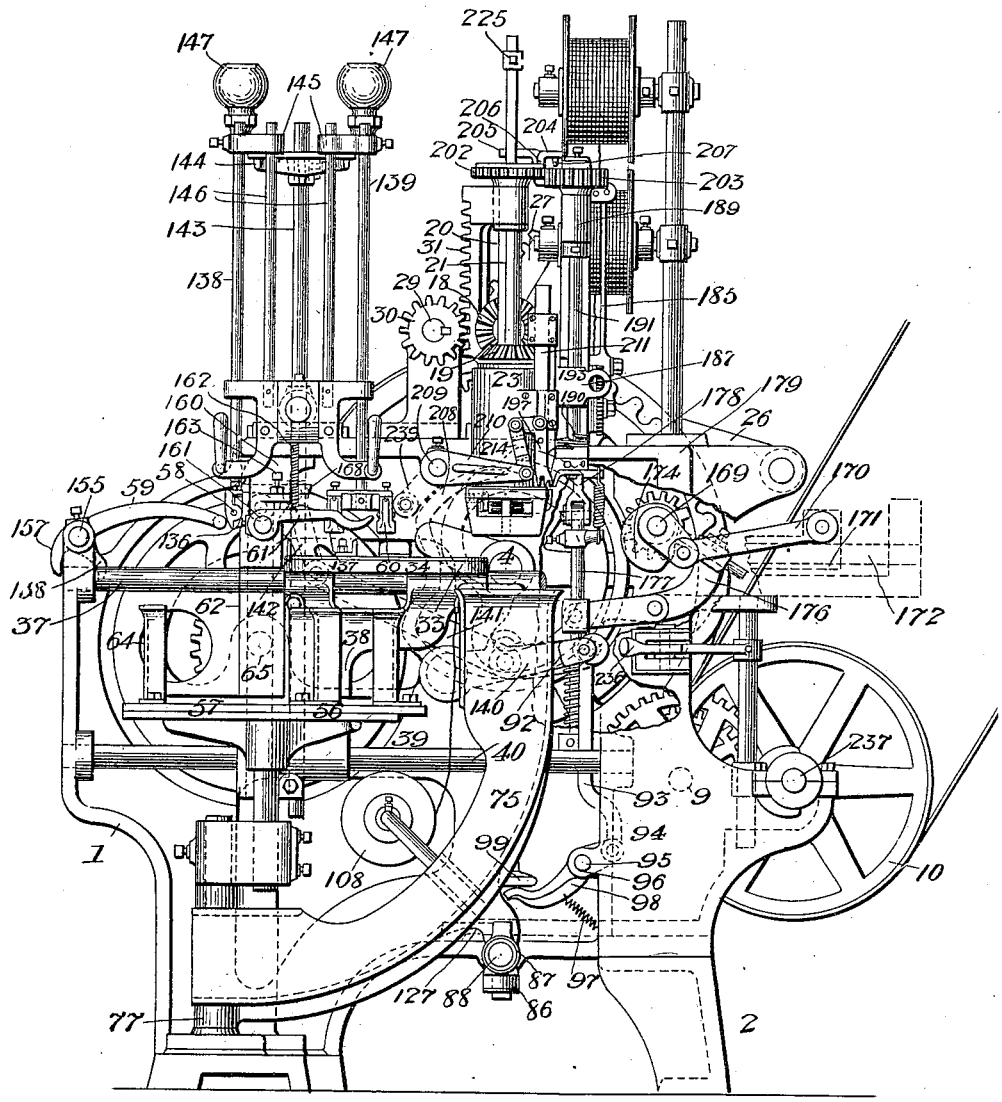

No. 680,149. Patented Aug. 6, 1901.
E. HORTON.
MACHINE FOR MAKING BASKETS.
(Application filed Mar. 18, 1901.)
(No Model.) 8 Sheets—Sheet 1.

Witnesses:
J. B. Coleman
C. Geisser

Inventor:
Emmet Horton
By Baldwin, Davidson & Wight
Attorneys

No. 680,149. Patented Aug. 6, 1901.
E. HORTON.
MACHINE FOR MAKING BASKETS.
(Application filed Mar. 18, 1901.)

(No Model.) 8 Sheets—Sheet 3.

WITNESSES:
INVENTOR
Emmit Horton
By
Baldwin, Davidson & Wight
ATTORNEYS

No. 680,149. Patented Aug. 6, 1901.
E. HORTON.
MACHINE FOR MAKING BASKETS.
(Application filed Mar. 18, 1901.)
(No Model.) 8 Sheets—Sheet 4.
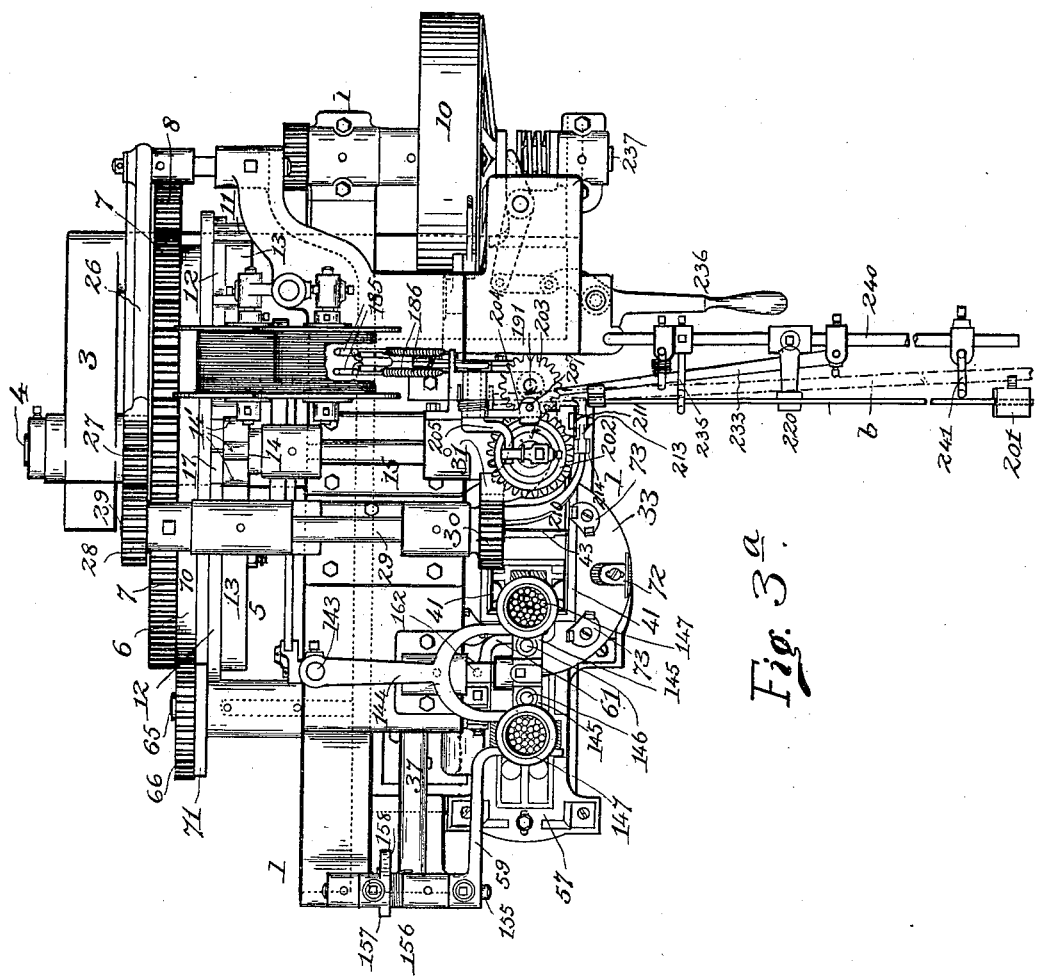
Fig. 3ª.
WITNESSES:
J. B. Coleman
L. E. Rook
INVENTOR
Emmet Horton
BY
Baldwin Davidson & Wight
ATTORNEYS No. 680,149. E. HORTON. Patented Aug. 6, 1901.
MACHINE FOR MAKING BASKETS.
(Application filed Mar. 18, 1901.)
(No Model.)
8 Sheets—Sheet 5.
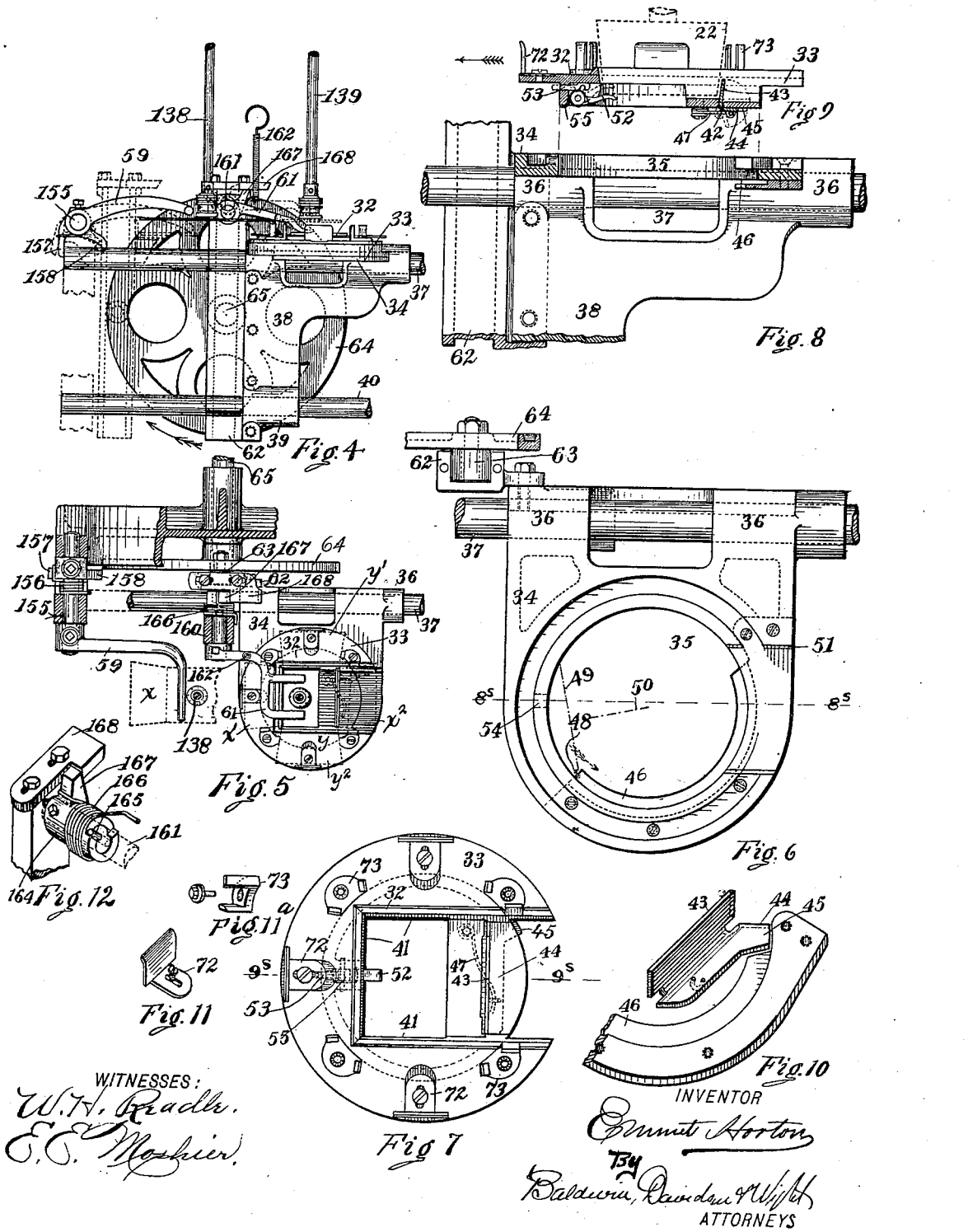
WITNESSES:
INVENTOR
ATTORNEYS No. 680,149. Patented Aug. 6, 1901.
E. HORTON.
MACHINE FOR MAKING BASKETS.
(Application filed Mar. 18, 1901.)
(No Model.) 8 Sheets—Sheet 6.
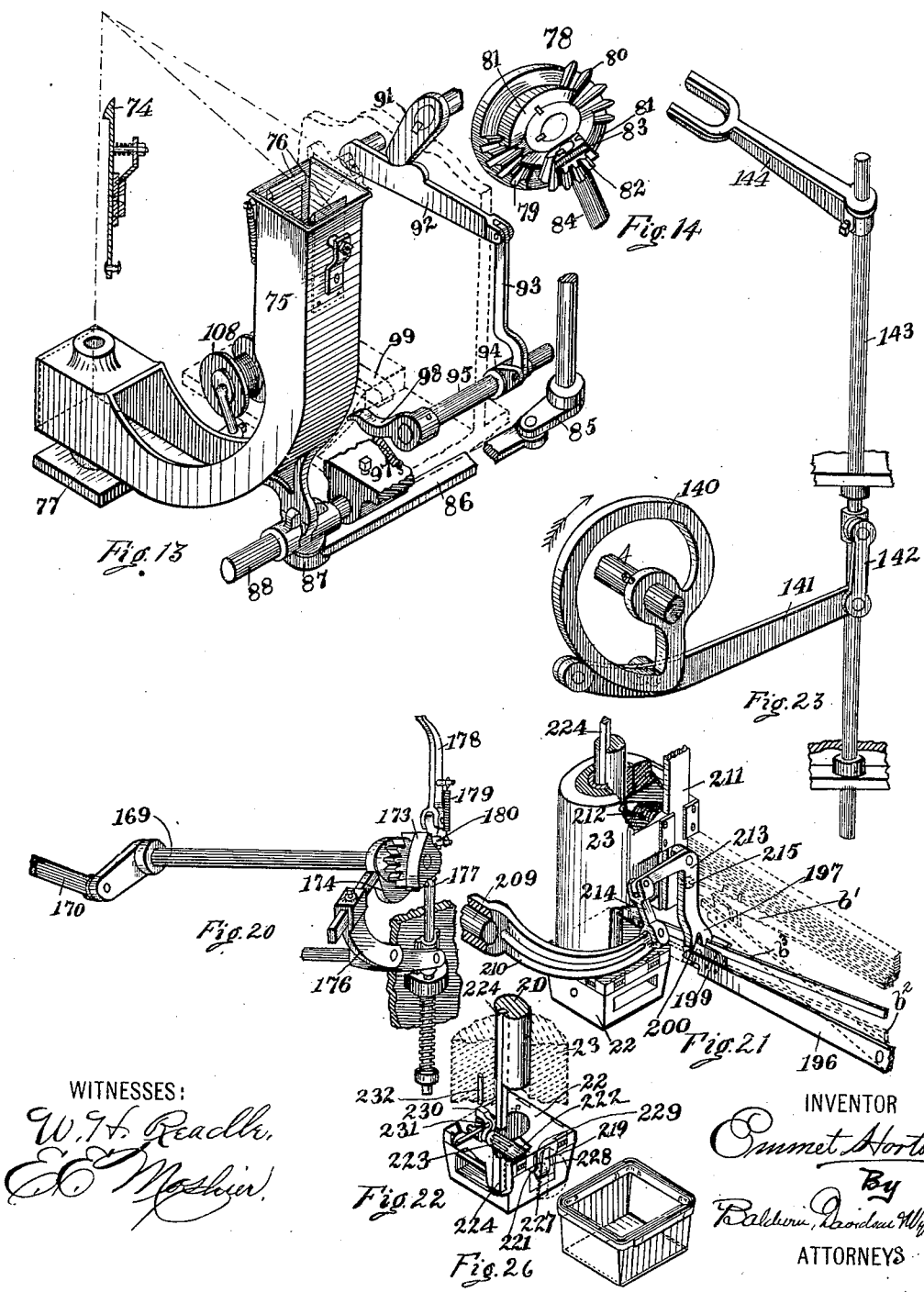
WITNESSES:
INVENTOR
Emmet Horton
By
Baldwin, Davidson & Wight
ATTORNEYS No. 680,149. Patented Aug. 6, 1901.
E. HORTON.
MACHINE FOR MAKING BASKETS.
(Application filed Mar. 18, 1901.)
(No Model.) 8 Sheets—Sheet 7.
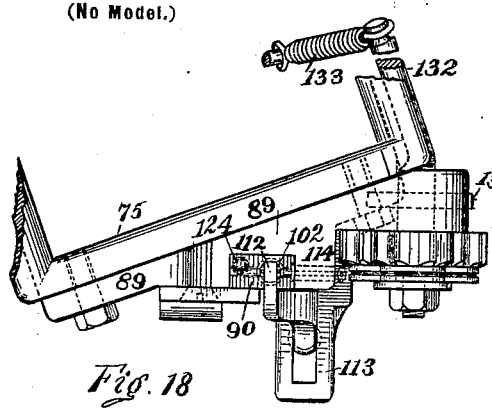
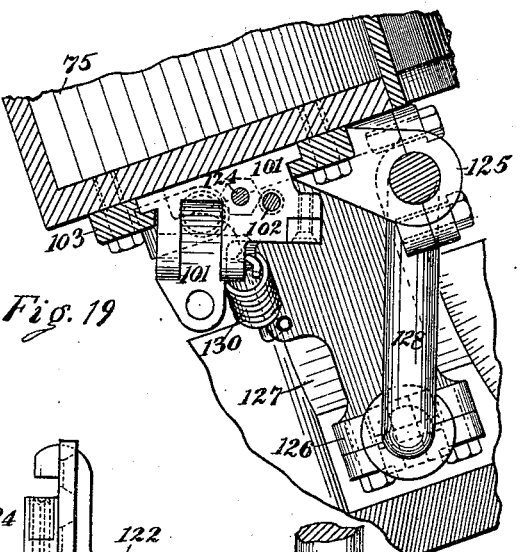
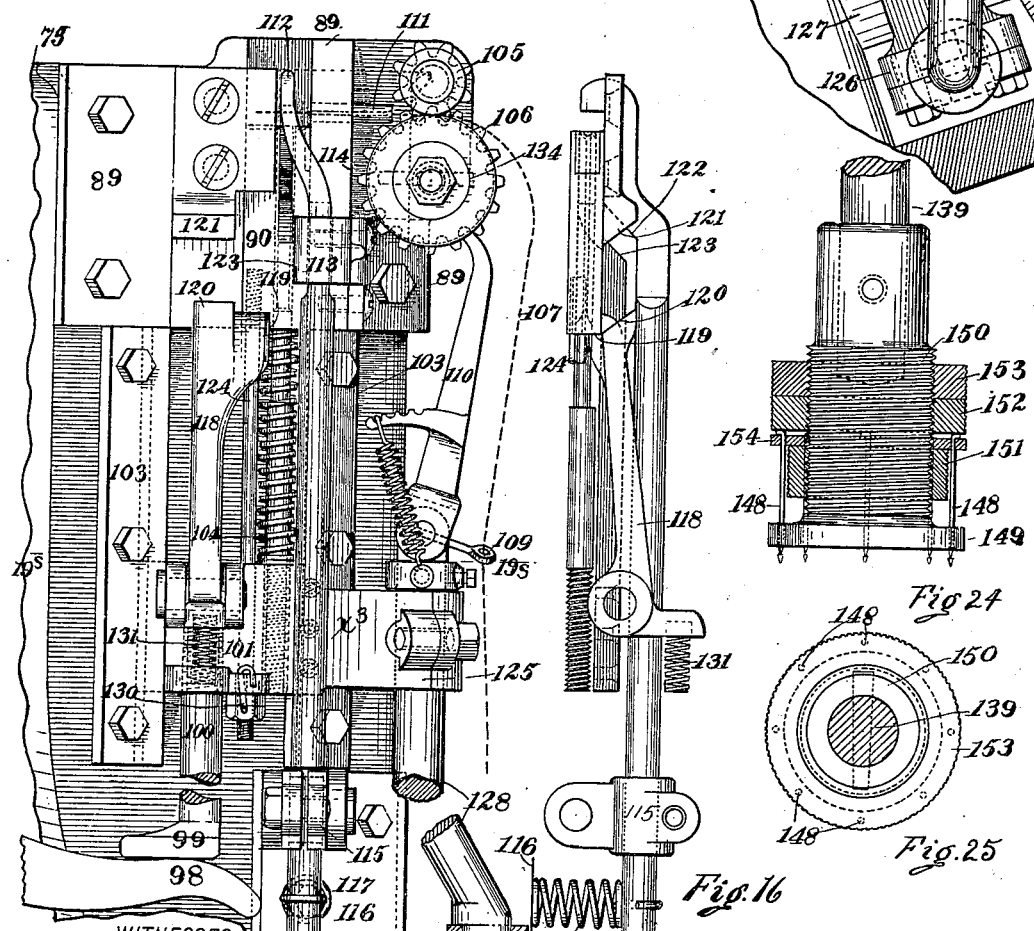
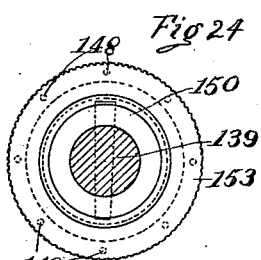
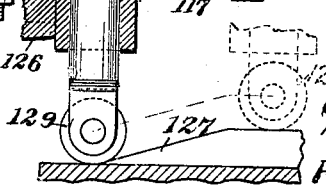
WITNESSES
INVENTOR
Emmett Horton
BY
ATTORNEYS No. 680,149. Patented Aug. 6, 1901.
E. HORTON.
MACHINE FOR MAKING BASKETS.
(Application filed Mar. 18, 1901.)
(No Model.) 8 Sheets—Sheet 8.
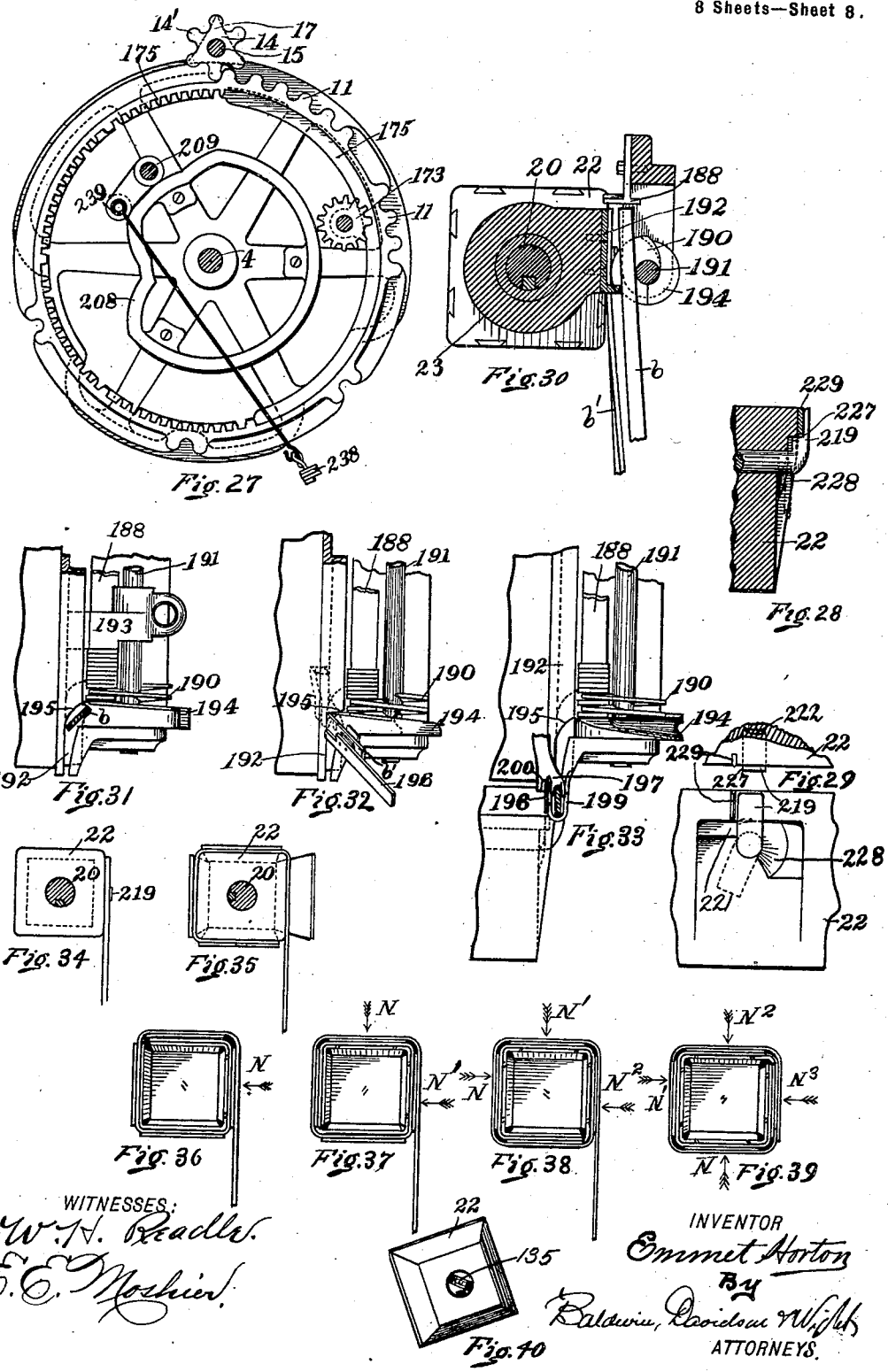

UNITED STATES PATENT OFFICE.

EMMET HORTON, OF ELMIRA, NEW YORK, ASSIGNOR TO HORTON BASKET MACHINE COMPANY, OF NEW YORK, N. Y.

MACHINE FOR MAKING BASKETS.

SPECIFICATION forming part of Letters Patent No. 680,149, dated August 6, 1901.

Application filed March 18, 1901. Serial No. 51,676. (No model.)

*To all whom it may concern:*

Be it known that I, EMMET HORTON, a citizen of the United States, residing in Elmira, county of Chemung, State of New York, have invented certain new and useful Improvements in Machines for Making Baskets, of which the following is a specification.

The invention relates to basket-machines of the class in which the sides and bottom of the basket are formed of crossed veneers or sheets of suitable material of appropriate contour that are bent into shape by forming mechanism and secured at their edges, as by a wrapped band lying inside and outside the edges and properly nailed or stapled. The machine herein shown is for the manufacture of what are known as "square" or "quart" berry-baskets; but machines having like principles of construction and modes of operation may be made for manufacturing similar baskets of different shape.

The invention herein claimed resides in various constructional and functional features which are set out in the following detailed description of the machine, taken in connection with the claims, and it would be needless to attempt to recite them *seriatim* in the preliminary part of the specification. It may be said, however, that the invention comprises new features of construction and mode of operation in connection with bringing together the blanks and forming mechanism in the final relation which they occupy for the formation of the blanks into basket form.

Heretofore in basket-making machinery it has been proposed to employ a forming-die and plunger or former, one being movable axially with reference to the other, but otherwise the two being in fixed relation to each other, and to feed the blanks in proper relation between them by hand or to employ blank-feeding mechanism for directly delivering the blanks to the forming mechanism or blank-conveying mechanism interposed between proper blank-feeders and the forming mechanism in the proper or desired angular relation to each other. These general plans are elementary and are well understood by those familiar with blank-feeding mechanisms, of which the prior art affords numerous illustrations. The organization herein shown is different structurally and in mode of operation from the other plans referred to in that one member of the forming mechanism makes an excursion away from its position of coöperative relation with the other member and to or toward the blanks, which are deposited over opposite or upon it in proper angular relation. While this is occurring, the partly-completed basket located at or upon the other member is being completed and discharged, after which the first-named member returns with the blanks for the next basket, which is formed or bent into shape and partly completed, when the operation described is repeated. Such a mode of operation increases the capacity of the machine and affords ample time where operating at high speed for the proper placing or delivery of the blanks to the member of the forming mechanism which receives them.

Figure 2:
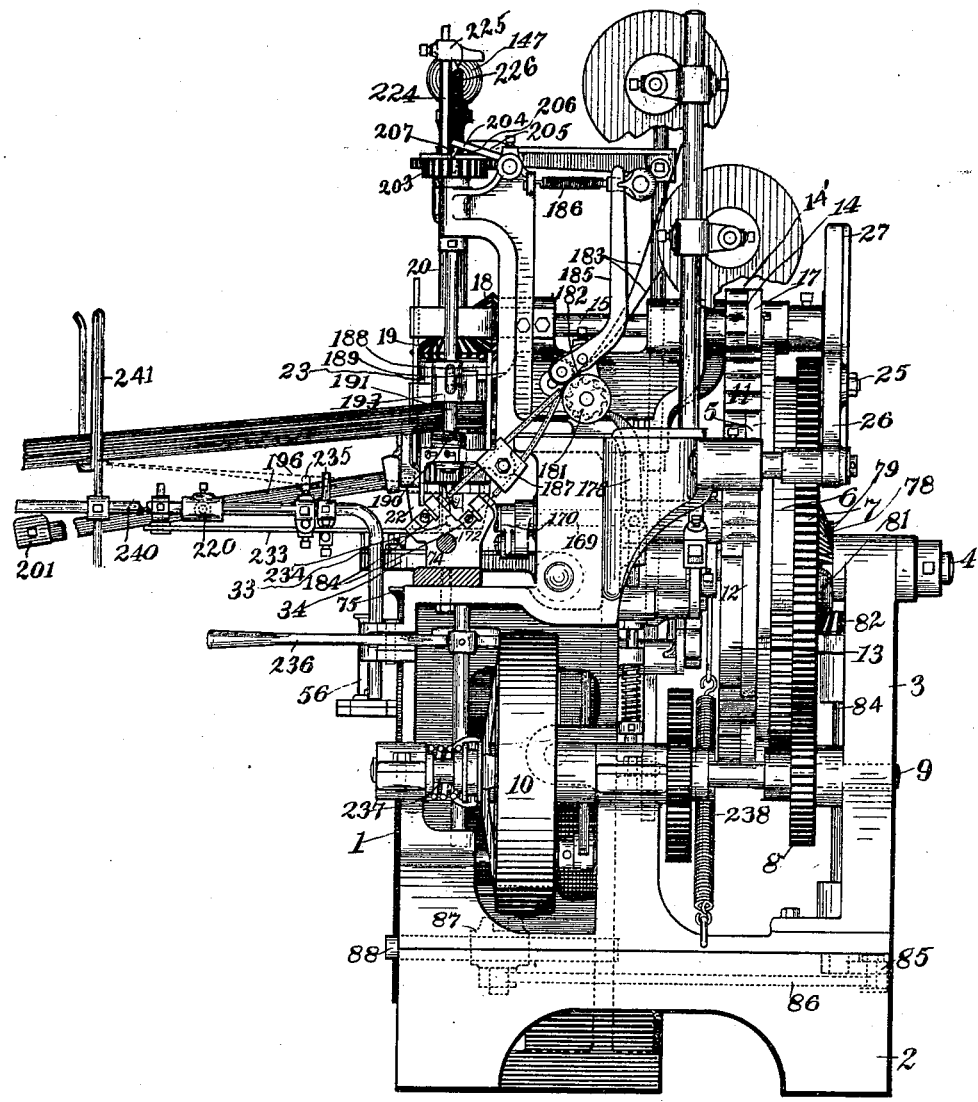
Figure 3:
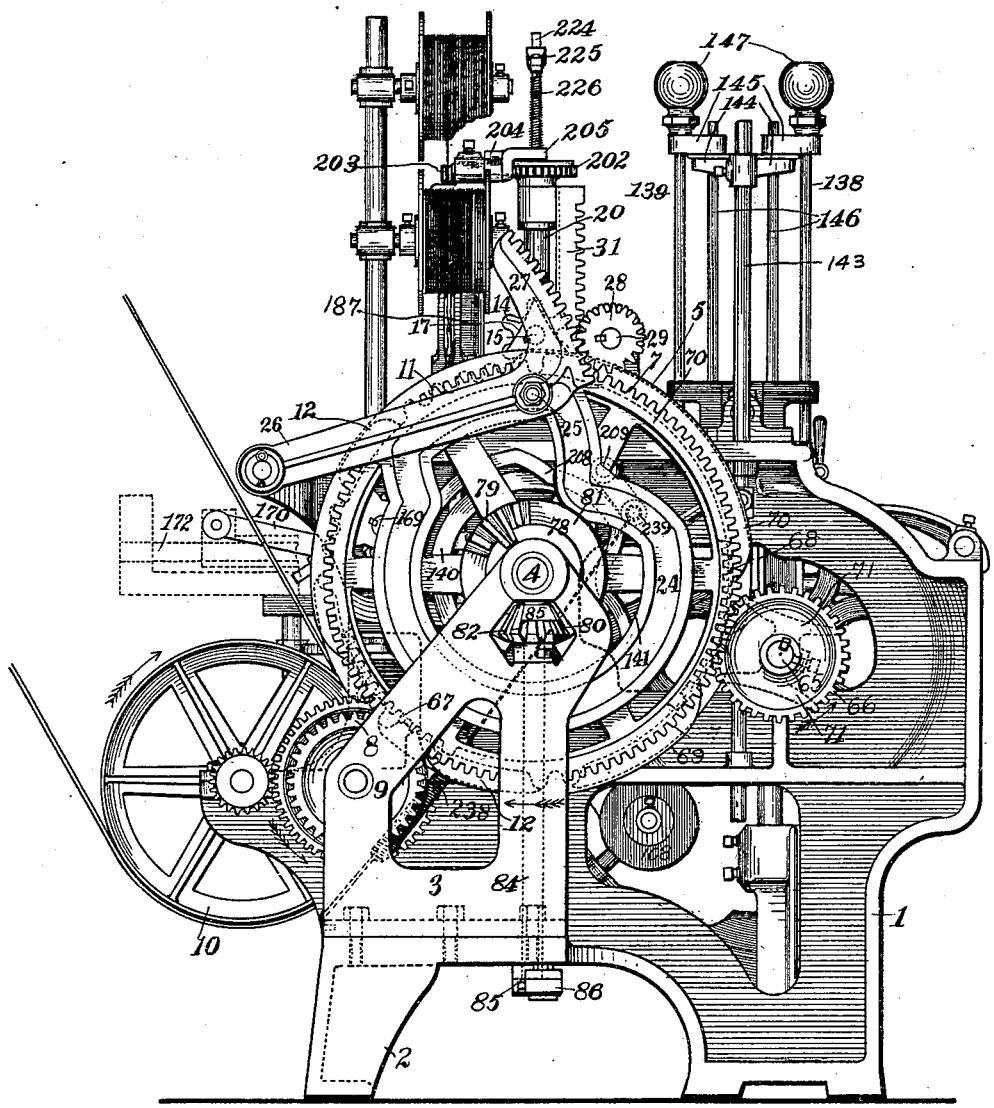

In the accompanying drawings, Figure 1 is a front elevation; Fig. 2, an elevation of the right-hand side of the machine; Fig. 3, a rear elevation; Fig. 3ª, a plan view; Fig. 4, a detail elevation showing the traveling basket-forming die, the blank-pickers and the hammers or wipers for stripping the blanks from the pickers and depositing them upon the die; Fig. 5, a detail view, partly in plan and partly in section, of the parts shown in Fig. 4; Fig. 6, a detail plan view showing the die-carrier plate; Fig. 7, a detail plan view of the die; Fig. 8, a section on the line 8 8 of Fig. 6; Fig. 9, a section on the line 9 9 of Fig. 7; Fig. 10, a detail view showing part of the die-carrier plate and the hinged member forming one side of the die. Figs. 11 and 11ª show detached the gages on the die; Fig. 12, a detail perspective view showing the shaft of one of the wipers for stripping a blank from a picker and some associated parts. Fig. 13 is a perspective view showing the chute for receiving the finished baskets and some associated parts relating to the nailer for driving a staple into the bottom of the basket, part of the frame of the machine being shown in dotted lines; Fig. 14, a detail view of a segmental and slide gear and its associated pinion and shaft for intermittently oscillating the basket-receiving chute. Fig. 15 is a front view representing the nailing mechanism for driving the staple in the bottom of the basket; Fig. 16, a detached view of the staple or nail making parts in the relative position shown in Fig. 15; Fig. 17, a detail view showing a part of the frame forming a track and a lower end of the plunger-shaft, carrying a roller running on the track for actuating the wire-feeding pawl of the bottom-nailing mechanism; Fig. 18, a plan view of the upper end of the nailer-frame plate of the bottom-nailer, with its gear-rollers, bender, and staple forming the block and showing also the inner side of the basket-receiving chute to which the nailing mechanism is attached. Fig. 19 is a section on the line 19 19 of Fig. 15, showing some of the parts; Fig. 20, a detached view of the pawl-operating mechanism for actuating the wire-feed rolls for the side-nailer. Fig. 21 is a detail view showing the form, the hub or sleeve in which the form-shaft has its bearings, and the mechanism for guiding or delivering the band to the former; Fig. 22, a detail view of the form broken away to show the parts contained therein. Fig. 23 is a detail view showing the mechanism for lifting and dropping the blank-pickers. Fig. 24 is a detail sectional view of a picker-head; Fig. 25, a plan view thereof with the picker-shaft in section; Fig. 26, a perspective view of the completed basket. Fig. 27 is a detail view showing the inside face of the main or big wheel from which most of the parts derive their motion and some associated parts. Fig. 28 is a detail sectional view showing one side of the form with its hook and a band lying in the hook. Fig. 29 shows detail views, one in plan and one in elevation, of part of the side of the form from which the band-retaining hook projects. Fig. 30 is a detail horizontal sectional view showing the screw-band feed, the band-ejector, the gage plate or abutment against which the ends of the bands in the band-hopper abut, and some associated parts. Fig. 31 is an elevation showing the band-screw feed and some associated parts and one band shown in section in the act of turning from its horizontal position to a vertical position for delivery to the form. Fig. 32 is a view similar to Fig. 31, showing the tension-lever engaging the band after it has turned to a vertical position for delivery to the form; Fig. 33, a similar view but more extended, showing the devices for guiding or delivering the band to the form; Fig. 34, a plan view of the form with a band deposited in the hook thereof. Fig. 35 shows the form, with the basket-blanks applied thereto, after it has made a three-fourths revolution from normal position and wrapped the band about it. Fig. 36 is a plan view showing a partly-completed basket, the form being omitted for clearness of illustration, after the basket has made one-half a revolution, the first nailing being indicated by the arrow. Fig. 37 is a similar view showing the basket after it has made a further one-fourth revolution, the two nailings being indicated by the arrows. Fig. 38 is a similar view showing the basket after it has made a further one-fourth revolution, the three nailings being indicated by the arrows. Fig. 39 is a similar view after the basket has made a further one-fourth revolution, the four nailings being indicated by the arrows. Fig. 40 is a bottom view of the form, showing the clench-plate in its bottom for turning down the ends of the nail or staple which is driven into the bottom of the basket.

The main frame 1 may be of the shape and style shown and be a one-piece casting, although preferably the feet 2, located at one side of the frame, and the vertical bracket 3 at the rear thereof, should be separately formed or cast. The main shaft 4 has a rear bearing in the bracket 3 and a front bearing, as shown, in a part of the main frame. It carries at the rear of the machine a large wheel whose periphery is divided circumferentially into three faces 5 6 7, Figs. 2 and 3. The rear face 7 is formed with ordinary continuous teeth meshing with a pinion 8 on the intermediate power-shaft 9, driven by gear connection with the power-shaft carrying the driving-belt pulley 10. All parts of the machine are actuated from this driving-pulley and its shaft. The front or forward part 5 of the large wheel is formed with groups or series of teeth 11, alternating with track-faces or raised faces 12 of less width than the teeth 11, the remaining surfaces adjacent to the tracks 12 and between the groups of teeth being cut away, the cut-away or depressed parts being marked 13 in Fig. 2. A pinion 14 on a counter-shaft 15, mounted in suitable bearings, is formed with teeth 14', that mesh with the groups of teeth 11, and at its rear with a triangular shoe or block 17, which travels upon the raised tracks or faces 12. Intermittent rotation is thus imparted to the pinion 14 and its shaft 15. The forward end of the shaft 15 carries a beveled pinion 18, meshing with the pinion 19 on the form-shaft 20 and connected therewith by a key and keyway connection 21, which permits of the vertical reciprocation of the form-shaft. The bevel-pinion 18 has twenty-one teeth and the pinion 19 on the form-shaft twenty-eight teeth. Therefore when the pinion 14 makes one revolution, which in its first movement it does, the form makes three-fourths of a revolution. The reason for this extent of rotation of the form-shaft, as is well understood and as is hereinafter described in detail, is that the band is applied to one side of the form and has three-fourths of a revolution to wrap it around the remaining three sides, after which the bottom and sides forming blanks are folded up against the form. The band is then progressively wrapped around the outside of the blanks and nailed and the basket discharged. The several stages of the work are shown in Figs. 34 to 39, inclusive. In the construction of machine herein shown after the three-fourths revolution of the form the form is moved down, as hereinafter described, to fold the blanks about it. The next group of teeth now impart two-thirds of a revolution to the pinion 14, the form moving through one-half of a revolution. The next group of teeth turns the pinion 14 through one-third of a revolution and the form through one-fourth of a revolution, and next the pinion 14 turns through one-third of a revolution and the form through one-fourth of a revolution, and finally the form is next turned through one-fourth of a revolution, the purpose of these consecutive partial revolutions imparted to the form being hereinafter described.

The form is marked 22. Its shaft 20 is mounted to move vertically in bearings 23 in the frame. As stated, after the form has made three-fourths of a revolution it is moved downwardly. It is then further intermittently rotated until the basket is completed. It then descends still farther in the construction shown to discharge the basket into a receiving-chute, after which it is raised to its initial elevated position. Such timely vertical movements of the form are effected as follows: In the rear face of the big wheel is a cam-track 24 of suitable shape, as shown, and in it runs a roller on a pin or projection 25 on an arm 26, pivoted at one end and at its opposite end having a segmental rack 27, that meshes with a pinion 28, fast on the shaft 29, having on its forward end a pinion 30, meshing with a vertical rack 31, carried by the form-shaft 20.

The die or female member 32 of the forming mechanism, Figs. 6, 7, and 8, is mounted in a circular plate 33, seated upon a horizontal reciprocating die-carrier 34, so as to turn thereon over a circular opening 35 therein. At its rear side this frame has bearings at 36 36 upon a fixed bar or shaft 37, extending across the front of the machine, and also has a downwardly-extending part 38, Figs. 4 and 1, which at 39 has a bearing on a bar 40 parallel with 36. The details of construction of this part of the apparatus are shown in Figs. 4 to 12, inclusive, and will now be described.

The die 32 is formed on three sides by the walls 41, rising from the circular rotary die-plate 33. The fourth side or wall, being that at the right looking at the machine from the front, is formed by a right-angle plate hinged at 42 on the under side of the revoluble die-plate and the upper blade 43 of which forms the side of the die and the lower part 44 of which has a projection 45, that runs on a segmental ledge 46 at the inner edge of the circular opening in the reciprocating die-carrier 34, so that at the proper time the upper blade 43 (or wall of the die) is held with its upper blade upright. A spring 47 normally holds the upper blade 43 in this position. Assuming that the form 22 is in the die, as indicated in Fig. 9, and that the die-carrier is moved to the left, (as presently described and as it will be moved while a basket in process of making is still on the form,) the blade 43 of the angular plate is by contact with the form pressed over flat against the force of its spring, as indicated by the dotted lines in Fig. 9. After passing the form the reaction of the spring 47 again lifts the blade 43. To explain the action of the parts 45, 48, and 46, the dotted lines 49 and 50 have been placed on Fig. 6, the former representing the axis of the hinge of the part 43 44 45 and the latter a radial line from the center of motion of the die. In addition to this relationship of the parts the part 45 when it engages the shoulder 48, which is the beveled end of the track 46, is turned down and is below the plane of the hinge. The primary function of the spring 47 is to hold the blade 43 up sufficiently to partially lift the end of the blank lying upon it and prevent the blank from striking the shoulder 51 in the beginning of the rotation of the die.

Hinged in a bifurcated lug or between two ears projecting on the under side of the die-plate 33, Figs. 7 and 9, is a presser-lever 52, which projects out into the die-opening in the path of the form as it enters the die. A locking-pin 53 is notched to engage a shorter arm projecting from the hub of the lever 52. Now as the form enters the die and presses down said lever the locking-pin is withdrawn from a hole 54 in the carrier-ring 34. On the side of the hub of the lever 52 is a spring 55, acting in opposition to the form. Thus it will be seen that when the form enters the die the locking-pin is withdrawn, and the die-plate may revolve with the form around to its initial position. Then if the carrier and die-plate move laterally away from the form the lever 52 passes out of engagement with the form and the spring forces the lock-pin into the hole 54 in the carrier-ring, again locking them together, in which relation they remain at all times while away from coöperative relation with the form and until the descending form enters the die.

To the left of the form are two hoppers or blank-holders 56 57, with their longer axes at right angles to each other. The travel of the die-carrier is of such extent as to carry the die from beneath the form to a point over the most distant blank-holder 57. When the die reaches its extreme left-hand position, a blank which has been lifted by a vertically-moving picker 58 is stripped from the picker by a hammer or wiper arm 59, Figs. 1 and 4, and is deposited on the die in the position indicated by the dotted lines *x* in Fig. 5. The die then commences its return movement to the right, and as it passes under another picker 60, which has lifted a blank from the holder 56, a hammer or wiper arm 61 strikes the blank and it is deposited over the die in the position shown at *y* in Fig. 5. The continued movement of the die brings it beneath the form; but before describing the action of the forming mechanism the mechanism for actuating the die-carrier will be described.

Description of the pickers and associated parts will be postponed to a later part of the specification.

Attached to the parts 36 39 of the die-carrier and in rear of the bars 37 40 is a vertical grooved or channel bar 62, in the groove of which works a roller-pin 63 on a wheel 64. As the wheel revolves in the direction of the arrow, Fig. 4, the die-carrier is reciprocated. In Fig. 4 the die-carrier is shown at the middle of its path of reciprocation. The wheel 64 is on the front end of a shaft 65, having at its rear end a pinion 66 gearing with two groups of teeth 67 68 on the circumferential part 6 of the large wheel, Fig. 3, and each having such numbers of teeth as will impart a half-revolution to the pinion 66. Between the groups are track-faces 69 70, on which concave faces 71, formed on the side of the pinion, run. The groups of teeth are not equidistant, but their centers are something more than ninety degrees apart, and the track-face 70 is of considerably greater length than the one 69. During the time that one of the concave faces 71 of the pinion is running on the track-face 70 the wheel 64 is at rest, with the die in position opposite the form. During the time the teeth of the pinion 66 are in mesh with the group of teeth 68 the wheel 64 makes a half-revolution and the die is carried to its extreme left-hand position under the picker 58. There it pauses, (and receives the blank, as described,) while a part 71 of the pinion is on the track-face 69, after which the pinion is again turned through a half-revolution by the group of teeth 67 and the die returns to its position opposite the form, receiving during its transit the second blank from the picker 60. Gages 72 73, of the construction shown in Figs. 11 and 11$^a$, are applied to the circular die-plate 33, as seen in Figs. 5, 7, and 9. During the time the die-plate has been making its excursion to the left the form has had a band applied to it, as will hereinafter be described, and has then been rotated through three-fourths of a revolution, so that the band has been wrapped about its four sides, Figs. 34 and 35. The die carrying the crossed blanks now comes under the form which is moved down and folds the ends $x'$ and $y'$ $y^2$, Fig. 5, up against three sides of the form and down upon the band thereon. The end $x^2$ of the blank $x$ is, however, not so folded, as the hinged side or wall 43 of the die yields, but is nevertheless raised sufficiently by wall 43 and its spring 47 to clear the shoulder 51 when the die commences to turn. The form now makes the following partial revolutions: First, through half a revolution, as already described, and the free end of the band is wrapped around two sides of the form and upon the blanks folded thereon, Fig. 36. Now while the form pauses the nailers 74, Fig. 2, of ordinary construction, are operated to nail together the inner and outer parts of the band and interposed blank at the second of said two sides or that to which the band has been last applied, (indicated by the arrow N, Fig. 36;) second, the form turns one-fourth revolution to wrap the band about the next or third side of the form and then pauses while the band and blank on that side are nailed, as indicated by arrow N', Fig. 37; third, the form turns a one-fourth revolution and pauses while the nailer is operated, as indicated by arrow N$^2$, Fig. 38; fourth, the form again makes a quarter-turn and the nailers operate, as indicated by arrow N$^3$, Fig. 39. The end $x^2$ of the blank $x$, which was not folded against the form when the plunger descended, is, however, raised during the second operation just above described in the following manner: The tongue or projection 45 on the lower blade 44 comes against the beveled end 48 of the ledge or segmental track 46 and the upper blade 43 is lifted positively into vertical position, folding the blank end $x^2$ up against the form, and it is nailed during the third operation above described. While the nailers in this third operation have moved forward, (and thereby hold the side and band while being nailed,) the die starts on an excursion to the left to get another set of blanks, and the fourth and final nailing operation occurs when only the form is present. When the last operation of nailing is completed, the form descends farther and deposits the completed basket in a curved chute or delivery-box 75, Figs. 1 and 13, having yielding hooked jaws 76, which pass over the edge of the basket and strip it from the form as the latter rises.

It is generally considered an advantage in the way of strengthening and stiffening baskets of this kind to staple together the blanks at the bottom, and this invention provides for that. The curved chute is pivoted at 77 at its lower horizontal end and is made to swing from under the form and back again at proper intervals. A nailer, Figs. 15, 16, 17, 18, and 19, mounted on the rear side of the chute 75, is actuated to drive a staple into the bottom of the basket while still on the form, after which the chute swings into position beneath the form to receive the completed basket. The mechanism is as follows: On the rear end of the main shaft, Figs. 2, 3, 13, and 14, is a mutilated bevel-gear 78, or rather a bevel-wheel with two groups of teeth 79 80, with intervening track or slide faces 81, giving intermittent motion to a pinion 82, having two opposite slide or flat faces 83, which run on the track or slide faces 81 of the pinion 78. On the lower end of the shaft 84, to which the pinion 82 is attached, is a crank-arm 85, whose pitman 86 is connected with a collar 87, sliding on a fixed rod 88 and attached to the chute 75. The chute being pivoted at 77 on ordinary trunnion-pivots is therefore at proper intervals swung outwardly from under the form and back again. The nailing mechanism bolted to the inner side of the basket-chute is operated only when the chute is at rest in its outer position, the nailer being then centrally under the form. Of course the chute may be so swung outwardly at any stage in the making of the basket and is only required to be beneath the form at the moment the latter descends to deposit the basket therein.

89 represents the base-plate of the under-nailing device, which is bolted to the outside of the inner wall of the basket-receiving chute 75 and projects a little above said chute, so that the nailing-block 90, traveling in a vertically-grooved way in said plate, can play upward to and from the bottoms of the baskets on the form, the nails being driven upward out of the nailing-block through the bottom of the basket and clenched on a clench-plate inserted in the lower end of the form-shaft 20, which comes through the form to a level with its bottom. The reciprocation of the nailing-block 90 at the proper intervals for nailing is obtained in the following manner, (see Figs. 1 and 13:) On the front end of the big wheel-shaft is rigidly secured a laterally-projecting arm or lug 91, which in its revolution strikes on and presses down a secondary lever 92. This lever has on its upper side a raised portion to receive such impact and is pivoted to oscillate in the frame of the machine at its left-hand end lying nearly horizontal, with its opposite end connected to a pitman 93, whose lower end connects with a bifurcated crank 94, secured to a shaft 95. This shaft is journaled in the main frame and in a box 96 on the front of the frame and lies in a plane parallel with the shaft of the big wheel and is rocked by the downward thrust of its pitman 93 against the returning action of a spring 97, attached to a driving-arm 98, adjustably fixed on the shaft and extended to come properly under a shoe or foot 99 on the lower end of a pendent rod 100, fixed to hang from a vertically-traveling head 101. In this head the nail-driving hammer 102 is fixed to project upward through the nailing-block 90 in longitudinal direction and to drive the nails from said block whenever the arm 91 in its rotation gives thrust to the parts that have been described. The head 101 is fitted and retained to travel between the parallel gibs 103, bolted into the side of the chute 75 just under the plate 89, which guides and retains the nailing-block 90. A spring 104 encircles the hammer-rod 102 between the head and the nail-block and serves to keep the block in advance of the hammer end until overcome by sufficient resistance to stop the block and allow the hammer to pass on through and drive the nail into the bottom of the basket. The driving-arm 98 comes under the nailer shoe or foot 99 and operates only when the chute is swung to its outer position, bringing the nailer which it carries with it and shoe directly over said driver-arm. The way in obtaining the proper movement of the chute has been heretofore explained. Figs. 15, 18, 16, and 19 show these nailers as they are attached, as I have described, to the side of the chute, the wire-feeding parts being a part of the same assembled mechanisms. In the plane of the upper plate 89 of the nailers are journaled the wire-feeding rollers with their accompanying gears 105 106, which keep the rollers in tangent relation as they feed the wire under pressure between them. The dotted line 107 represents the wire passing from a spool 108, journaled on an angular arm adjustably secured to the lower inner side of the chute, then up through an eye 109, which secures the pivoting-pin of the pawl 110 in place, and projects to form the eye, and thence over and between the geared rollers through a hardened-steel tube 111 in the wall of the plate 89, and then across the channel in front of the advancing end of the nailer-block and just back of a bender 112, projecting in said channel and guided in a slotted arm 113, projecting astride of it and bolted to the side of the wall at 114. The bender has a pivotal bearing in a grip 115, which in turn is pivoted in a bifurcated stud-plate 116, also bolted to the side of the chute underneath the ways or gibs 103. A spring 117, retained under the lower end of said bender and resting on the stud-plate, serves to give the forming end of the bender sufficient return tension. In like manner within an eared and mortised portion of the head 101 is pivoted a pawl 118, which at its forward end has a shoulder 119, coming under the lower end of the nailing-block, and by its side another shoulder 120, which is beveled upwardly and outwardly to come in contact at the proper time as the pawl advances with a counter beveled end of a plate 121, which serves to free the pawl from the nailer-block just after the staple has been made and drawn sufficiently in the nailing-block by the bender. At about this time the bender is also lifted from in front of the nailer-block by its beveled offset part 122 being lifted by the beveled advancing end of the bar 123, which is bolted, as may be seen at $X^3$ in dotted lines, to the traveling head 101 directly beneath the bender. The plate 121 also serves to hold the nailing-block 90 in its channel, and the rod 124, which is screwed into the lower end of the nailing-block beneath where the shoulder of the pawl 118 takes hold and which passes loosely down through the head and has upon it check-nuts, serves to regulate and retain the distance upward of the nailer-block from the head, but permits a closing of this distance by the rod sliding in the head as the spring 104 is compressed by the hammer in driving the nail at the uppermost stroke of the head. At a part of the gib 103 (shown at the right hand) projects an arm-box 125, and below this box farther down on the side of the chute is bolted to project another arm-box 126, Figs. 17 and 19. These boxes are of different heights from the chute. The lower one being the longest, when the chute is on its inward stroke it projects in over the base edge of the frame of the machine and over an inclined surface 127 thereof, which may be seen at 127 in Fig. 1, also in detail in Figs. 17 and 19. In these arm-boxes is journaled to reciprocate to the extent of the incline 127 the offset rod 128, which has its lower end bifurcated. A roller 129 is journaled therein and as the chute oscillates travels up and down the inclined track. This action through the pawl 110, pivoted on the upper end of the said rod and engaging the feed-gear 106, rolls said gear forward a tooth or two at each reciprocation of the rod with its roller up the inclined surface or track 127, thus feeding the wire when the chute is traveling inward and making the staple and driving same when the chute is at rest in its outward stroke. The spring 130 is attached to the arm-box 126 and extends upward to the sliding head 101 and serves to draw the head and its accompanying mechanisms down to normal position should their own weight at any time fail to do so. 131 represents a spring which is seated against a lip of the head 101 and a projecting tail of the pawl 118 and assures the proper application of the pawl to the shoulder in the nailer-block. The stud on which the wire-roller 106 has its bearing is continued back through the base-plate 89 and terminates in a lever 132, passing across the front on the left-hand side of the chute, where a spring 133 is attached to it and to the chute. The hole in the plate 89 where this stud-lever passes through is slightly cut away, so the lever can slightly turn on a pin 134, which is put through the plate and said lever. This movement permits the feed-roller to move upward and grip on the wire between it and the smaller roller, above which it is rigidly fixed. A clench-plate 135, Fig. 40, is set in the bottom of the form to clench or turn the points of the nails or staples driven into the bottom of the basket.

The picker mechanism will now be described.

The pickers 58 and 60 are of the kind having needle-points that enter the top blanks of the piles of blanks upon which they descend and lift the top blanks as they rise. In Fig. 1 the needle-heads 136 137 are shown as consisting of a cross piece or head, at opposite ends of which are downwardly-extending parts from which project needle-points that enter the blanks. Such needle-heads are similar to those used in my machine for making "Climax" or grape baskets. They have not been illustrated in detail and will not be specifically described because the preferred form of needle-head is shown in Figs. 4, 24, and 25. In either case the needle-heads are attached to the lower ends of vertically-reciprocating rods 138 139, mounted in suitable bearings. The mechanism for lifting and dropping these picker-rods is indicated in dotted lines in Fig. 1, and is also seen in Figs. 2 and 3. On the main shaft 4 is adjustably fixed a cam-wheel 140, which in its rotation gives vertical oscillation to a lever 141, which in turn by a link connection 142 gives vertical reciprocation to the rod 143, which has a cross-bar 144 on its upper end, the bifurcated ends of which extend under guide-lugs 145, traveling on guide-rods 146 and attached to the vertically-reciprocating picker-rods 138 and 139. Globes 147 on the upper ends of the needle-rods are to contain shot or other suitable material to regulate the weight, and consequently the force with which the needles in the needle-heads will enter the blanks in the hoppers or holders. The shape of the cam 140 is such that the needle-rods are dropped more quickly than they are raised. The cam 140, lever 141, link connection 142, and vertically-reciprocating rod 143 are shown isolated and in detail on an enlarged scale in Fig. 23 and are indicated by dotted lines in Fig. 1 and partly seen in Figs. 2 and 3. The movements of these parts are so regulated that at a proper time when the die-plate is in its right-hand position the needle-rods are allowed to drop suddenly, the needles enter the blanks in the two holders, and the rods are then lifted, the two blanks being carried up with the needle-heads. Subsequently the die-carrier in its excursion to the left passes beneath the suspended blanks and pauses for a moment in its extreme left position. Before, however, describing the operation of the fingers, hammers, or strippers for removing the blanks from the needles and depositing them over the die I will describe the special form of needle-head which I prefer to employ. It is shown in detail in Figs. 24 and 25. This needle-head affords means of adjustment of the needles—that is, for regulating the extent of their projection from the bottom faces of the head. The needles are marked 148. The head is cylindrical in form, although the lower flanged face 149 thereof may be of any peripheral contour. Above it the part of the head 150 is exteriorly threaded, and on this thread is fitted to screw a lower ring 151 and two upper rings 152 153. Between the two upper rings and the lower ring is an unthreaded ring 154 with holes in it, through which the needles pass, the heads of the needles resting upon the upper face of the ring. The needles pass outside of the periphery of the lower threaded ring 151 and then pass through apertures in the flange 149 of the head. The needles can be raised or lowered by running the lower ring up or down and can then be securely locked by the pressure of the lower one of the upper rings, the upper ring 153 acting as a check-nut. The pivoted finger or hammer 59, which strips from the left-hand picker the blank and deposits it over the die, is marked 59 and is shown particularly in Figs. 1, 4, and 5. It is pivoted at its left-hand end, as shown in Fig. 5, and its right-hand end is turned outwardly, so as to extend entirely over or above the blank $x$. Applied to its pivot-shaft 155 is a spring 156, tending to hold the outer or free end of the hammer up, while a stop-arm 157, bearing against the frame, limits its upward movements. Projecting from its pivot-shaft and toward the right is another arm or projection 158, which stands in the path of the vertical grooved bar 62, through the medium of which the die-carrier is reciprocated. As the die-carrier reaches its extreme left-hand position the bar 62 strikes the toe or projection 158 and the hammer or arm 59 is thrown downwardly with sufficient energy and strips the blank $x$ from the picker-head 58, the blank falling in position between the gages on the die-plate. The other hammer or stripper-arm 61, which deposits the second blank $y$ over the die as the die-carrier moves to the right, is operated in the following manner, (see particularly Figs. 1, 4, 5, and 12:)

From the front of the frame is a downwardly-extending part or bracket 160, Figs. 1 and 5, in the lower end of which a rock-shaft 161 has its bearing. The stripper-arm 61 is fast on the end of this shaft and is normally held up by a spring 162 against an adjustable screw-stop 163. Surrounding the rock-shaft is a sleeve 164, Fig. 12, the outer end of which is notched or cut away, as shown, and against the shoulder of this notch a pin 165 normally bears, a spring 166 being applied around the sleeve and so connected that its reaction normally presses the sleeve in such direction that the said shoulder is against the pin in the shaft. At the rear end of the sleeve is an upwardly-projecting lug 167, which lies in the path of a plate 168, adjustably mounted, as shown, on the upper end of the channel-bar 62 of the reciprocating die-carrier. As the die-carrier moves to the left this plate strikes the lug 168 and throws it to the left, passing over it, after which the reaction of the spring 166 returns the lug and sleeve to normal position. After the carrier has received the blank $x$ and when during its return movement it is in proper position under the picker 60 the plate 168 strikes the lug 167, throwing it to the right and passing over it; but in so doing a partial rotation is imparted to the rock-shaft 161 and the stripper 61 is thrown downward upon the blank $y$, disengaging it from the picker and depositing it in proper position over the die. As before stated, the gages 72 73 hold the blanks in proper position. If, however, the blank $x$ has fallen or been deposited over the die, so that its right-hand end is too far to the right, this error is corrected by the edge of the blank striking against the face of the nailer 74, Fig. 2, as the carrier comes into its extreme right-hand position beneath the form. This nailer is indicated in Fig. 2 and in dotted lines in Figs. 1 and 3, and, as stated, it is of common construction, and it is to be operated in the way that such nailers usually are—viz., for the head of the nailer-blocks first to advance against the band or side of the basket and then the hammer is operated to drive the staple. These actuations of the nailing mechanism may be imparted by means of the crank-shaft 169. (Shown in Figs. 1, 2, and 3 and in detail in Fig. 20.) In Fig. 1 a portion of the frame is broken away to more fully show this crank-shaft with its pitman 170 and the wire-feeding mechanism located back of the front of the frame. The pitman 170 connects to the nailer cross-head or driver 171, that may be of any proper construction, reciprocating on the shaft 172. Motion for the nailer crank-shaft and also for the wire-feeding parts is imparted through the pinion with a fixed sliding surface 173, Fig. 27, and cam 174 on the inner end of the shaft 169, the pinion having intermittent or proper rotations from an internal gear and slide 175, Fig. 27, of the big wheel. The said sliding surfaces may be seen in Fig. 27 most plainly. As the shaft 169, Fig. 20, revolves, its cam 174, at the proper interval when the nailers are in outstroke, oscillates the lever 176, which through proper connection gives vertical reciprocation to a plunger-rod 177, guided in bearings of the frame and driving a pawl 178, pivoted to its top end. The spring 179, connecting the pawl, and a collar 180, adjustably bolted on the rod, can be arranged to give the pawl proper adhering tension on the wire-feed-rollers ratchet 181, thus revolving the wire-rollers 182, which advance the wires 183 in front of the nailer-blocks 184 previous to their begining their inward stroke toward the form. The wire is contained between the wire-feeding rollers by the pressure-levers 185, pivoted to a stud in the frame near the feeding-rollers 182, the upper end of the levers being acted upon by the springs 186. By this means the wire is guided and pushed through the wire-tubes to the nailer-head and knives. The tubes are gripped in proper position under a cap bolted to the lower portion of the band-screw standard 187. Such nailers and the modes of operating them being common and well known further illustration is deemed unnecessary.

The band mechanism and coöperating parts will now be described with special reference to Figs. 1, 2, 3, 21, 22, 27, 30, 31, 32, and 33.

A bracket or projecting arm 240 extends forward from the front of the machine just to the right of the form. Near its outer end it carries a band-holder 241, which supports the bands arranged flatwise therein. The bands $b$ extend toward the machine, with their inner or front ends against a gage-plate 188, adjustably bolted to the band-screw standard 189, this gage guiding the end of the bands to the proper point or position on the form. The bands rest on the feeding-disks 190 of a spiral or screw feeder, the vertical shaft 191 of which and a band-channel plate 192, attached to the side of the form-box 23, act as side walls to guide and hold the bands. A weight or follower 193, to hold or clamp the inner ends of the assemblage of bands, is vertically movable on the screw-shaft to permit the introduction of new bunches of bands. Below the screw-disks or band-feeding spirals 190 is a band-discharge cam 194, having a groove in its periphery, into which the edge of a band is delivered or led, and by the rotation of the cam the band is forced laterally, its opposite edge striking the curved face 195 of the discharge-channel 192 and the band being so turned up edgewise, as seen in Figs. 31, 32, and 33, where the band is marked $b$. Fig. 30 shows the band-ejector 194 of the band-scews 190. It also shows the band and gage 188 and the position on the ejector-disk 194 of the band $b$ and the position $b'$ of the same band (or the previous band) after the disk has made a complete revolution. Fig. 31 shows the band in the act of turning from position $b$ to $b'$, as seen in Fig. 30. Fig. 32 shows the band in the position $b'$ and the relative position of the tension-lever 196 and in dotted lines the follower 197 in the act of taking the band downward from that position and into the position as seen in Fig. 33 while the band-ejector 194 is on its way around to deliver another band from the screw out into the throat or channel 192 and in the path of the band-follower in its downward stroke. The vertical shaft 191 and its spiral or screw band-feed 190 receives intermittent rotation, as will presently be described, and acts to separate bands from the bottom of the pile and gradually draw them down, turn, and discharge them into the delivery-channel 192. This screw-feed is similar in many respects to that shown in my Letters Patent No. 635,725, dated October 24, 1899.

On the top of the form-shaft 20 is a gear-wheel 202, which meshes with a corresponding gear 203 on the band-screw shaft 191, the teeth of these two gears being so proportioned that the initial three-fourths revolution of the form-shaft turns the band-screw through one revolution. The gears then separate as the form and its shaft descend in the performance of the operations already described. To insure that these gears will properly mesh or come together as the form-shaft subsequently rises, a small lever 204 is pivoted on the arm 205 of the band-screw-shaft standard and has on its free end a downwardly-projecting lip 206, that runs on a track on the upper side of the gear 202 on the form-shaft, and near this lip the lever has a downwardly-projecting pin 207, that enters a hole in the upper side of the gear in the band-screw shaft when the form-shaft descends, thereby locking the band-screw-shaft gear into correct position, so that the gear on the form-shaft will properly engage it when it again rises. On the big wheel at the rear of the machine is a cam-track 208, Fig. 27, upon which a roller arm or stud on a shaft 209 runs. This shaft or lever 209 is appropriately pivoted in the frame of the machine and carries at its forward end a curved arm 210, Fig. 21.

Mounted to slide vertically on the front face of the hub 23, in which the form-shaft has its bearing, is a plate 211, against which presses a spring 212, Fig. 21, holding the plate frictionally. On this plate is pivoted a bell-crank lever 213, the horizontal arm of which is connected to the end of the lever 210 by a link 214 and the downwardly-extending arm 197 of which bell-crank lever is notched at its lower end, as shown in Fig. 21. Thus the lower notched end of the bell-crank lever is, when the curved arm 210 oscillates, oscillated horizontally a given distance, regulated by a pin 215 on the plate projecting into a cavity in the rear face of this downwardly-extending arm of the bell-crank lever, before the plate 211, which is frictionally held, will move either up or down. When one of the bands has been fed by the screw-feed into position and partly turned or twisted, as indicated by the dotted lines $b'$ in Fig. 21, the follower-arm 197 in its upward stroke swings away from the lower separated band $b^2$. At this time the hook or jaw 199 of the tension-lever 196 is by its weight 201, Figs. 2, 21, 32, and 33, raised to receive or embrace the advanced band. In its downward stroke the arm 197 when it again receives motion from the curved arm 210 will first swing away from the form and directly over the band $b'$, and then as the frictionally-held plate 211 yields it descends upon the band and throws it down between the band-hook 219 on the form and the side of the form and also pushes it into the fork 199 of the weighted tension-lever 196, pivoted at 220 in a block on a bracket or arm 240. Thus the arm or follower 197 comes astride of the band and drives downwardly the lever 196 by its pressure on the band which lies in the hook or fork 199, the band being driven to the bottom of the hook 199 before the free end of the lever 196 comes in contact vertically with the bottom of the guiding-notch 200 therefor in the follower-arm. This final position is indicated in Figs. 33 and 21, in which the band being manipulated is indicated in three positions by the letters $b'$, $b^2$, and $b^3$, the latter representing the band in an intermediate or partially-transferred position. A tension, adjustable by means of the weight 201, is thus applied to the edge of the band while it is being wrapped about the form and throughout the making of the basket. The weight 201 on the end of the tension-lever is adjustable, as is also the block in which the lever is pivoted.

The band-hook 219 behaves and is operated as follows: The shaft 222 of the hook passes through the form and has gear-teeth cut therein at 223, which mesh with a rack 224, which is let into a recess in the form-shaft flush with its circumferential face and extends upwardly beyond the upper end of the form-shaft and has upon its upper end an adjustable stop 225. A spring 226 connects this stop with the top end of the form-shaft. The action of the spring is to pull the rack downwardly, and thus keep the band-hook turned in upright position, as shown in Figs. 22 and 29, to receive the band and hold it, as described, the shoulder 227 of the hook being so shaped as to come against an offset 221 on the form to prevent the hook under the stress of the spring 226 from being moved beyond the vertical position shown in Fig. 22. The band having been delivered between the side of the form and the hook, the operations already described occur; and when the form finally drops down to deposit the completed basket in the chute 75 before the completion of such final downward movement of the form the stop 225 comes in contact with the arm 205 of the band-screw-shaft standard, and the movement of the rack with the form-shaft being arrested the continued downward movement of the form causes the arrested rack to turn the hook-shaft 222 through a little more than one-half of a revolution, so that the hook now points downwardly and is by a spring applied to its shaft, as hereinafter described, drawn somewhat inwardly toward the side of the form. A cam-plate 228, Figs. 22 and 29, permits the gradual approach of the hook to the side of the form as the hook is turned downward. On the side of the form alongside the hook when the latter is turned upward in position to receive a band is a steel plate with a vertical sharp edge 229, which assists in holding the band in position and in the hook against the longitudinal strain on the band while being wrapped about the form. The direction of revolution and downward position of the hook are shown by the dotted lines in Fig. 22. When the form is in its lowest position, the rim or edge of the basket is engaged by the hooks 76 in the mouth of the chute, and as the form rises the basket is stripped from it and the hook commences to return to its normal position, (shown in full lines in Fig. 22,) being carried outwardly by the inclined cam or face 228 sufficiently to bring it when upright close up to the side of the form. It does not receive a sufficiently-rapid upward movement to interfere with the stripping of the basket from the form, and it is brought to a vertical position against the piece 229 on the side of the form, which acts as a stop to arrest the hook. In the top of the form is pivoted a bell-crank lever 230, the lower bifurcated end of which engages an annular groove on the hook-shaft, and the upper end or arm of the lever projects beyond the face of the form, a spring 231 being applied to this small bell-crank lever, whose reaction is such as to tend to throw the upper arm of the lever upwardly and to cause the lower arm of the lever to draw the hook inwardly against the side of the form. As the form rises to its uppermost position a pin 232, projecting from the bottom of the hub 23, in which the form-shaft has its bearing, strikes the upper end or arm of the bell-crank lever and depresses it against the tension of its spring, thereby moving the hook outwardly away from the side of the form. In this position of the hook the band is delivered between it and the side of the form, as already described, and as the form commences to make its initial three-fourths revolution to wrap the band about it, as described, the end of the bell-crank lever 230 runs off of the projecting pin 232, and the reaction of the spring 231 draws the hook toward the side of the form and clamps the end of the band against it.

The part marked 233 in Fig. 2 is a band-guide. Its outer horizontal part is mounted in blocks on the arm or bracket 240, while its inner end is turned at right angles up alongside of the form. Near the lower end of its upturned part is a notch 234, and above the notch it is beveled, as clearly seen in Fig. 2. When the band has been wrapped around the four sides of the form and the form descends, the beveled end of the guide rides over the band, and when the form comes to rest in its second position the band thereon will enter the notch 234 and is thus finally held and guided while being finally wrapped and nailed. 235, Fig. 2, is an adjustable gage mounted on the bracket or arm 240 and extending over the upper edge of the tension-lever 217 and serves to limit its vertical movement. 236 is an ordinary clutch-lever for connecting and disconnecting the driving pulley-wheel from the pulley-shaft 237. The spring 238, Figs. 2 and 27, is applied to the lever on the shaft 209, Figs. 21 and 27, and in rear of its pivot holds the forward end of the lever upward and also holds the roller-stud 239 on its rear end against the cam-track 208.

I have described a machine which practical operation has demonstrated to be an efficient embodiment of my invention. It is clear, however, that skilled mechanicians may vary the structural details without departing from the invention or the mode of operation of its several elements as shown and described. It is also plain that some features of the invention may be used without others and in machines which in other respects may differ generally or specifically from that shown. I do not, therefore, wish to limit myself to details of construction or to the conjoint use of the several features of the invention.

I claim as my invention—

1. In a machine for making baskets, the combination of blank-bending mechanism comprising a form and die, means for actuating said mechanism to bend the blanks, means for separating these two members at a time when a partly-completed basket is on the form and subsequently restoring their coöperative relation, whereby material for the formation of the body of another basket may be delivered to the die while separated from the form, and means for completing the partly-made basket on the form while the two members are so separated.

2. In a machine for making baskets, the combination of blank-bending mechanism comprising a form and die, means for actuating said mechanism to bend the blanks, means for separating these two members at a time when a partly-completed basket is on the form and subsequently restoring their coöperative relation, whereby material for the formation of the body of another basket may be delivered to the die while separated from the form, means for completing the partly-made basket on the form while the two members are so separated, and means for applying to and about the form a band for the next basket to be made from the material so delivered to the die.

3. In a machine for making baskets, the combination of blank-bending mechanism comprising a form and die, means for actuating said mechanism to bend the blanks, means for separating these two members at a time when a partly-completed basket is on the form and subsequently restoring their coöperative relation, means for automatically feeding blanks for another basket to the die while so separated from the form, and means for completing the partly-made basket on the form while the form and die are separated.

4. In a machine for making baskets, the combination of blank-bending mechanism comprising a form and die, means for actuating said mechanism to bend the blanks, means for separating these two members at a time when a partly-completed basket is on the form and subsequently restoring their coöperative relation, means for automatically feeding blanks for another basket to the die while so separated from the form, means for completing the partly-made basket on the form while the form and die are separated, and means for applying to and about the form a band for the next basket to be made from the blanks so fed to the die.

5. In a machine for making baskets, the combination of blank-bending mechanism comprising a form and a laterally-reciprocating die, means for actuating said mechanism to bend the blanks, whereby the blanks for a basket may be deposited on the die while reciprocated laterally away from the form, and means for applying a band to and about the form during the lateral excursion of the die.

6. In a machine for making baskets, the combination of blank-bending mechanism comprising a form and a laterally-reciprocatable die, means for actuating said mechanism to bend the blanks, means for reciprocating the die laterally while an unfinished basket is on the form, whereby the blanks for another basket may be deposited on the die while it is removed from the form, and means for finishing the uncompleted basket on the form during the lateral excursion of the die.

7. In a machine for making baskets, the combination of blank-bending mechanism comprising a form and a laterally-reciprocatable die, means for actuating said mechanism to bend the blanks, means for reciprocating the die laterally while an unfinished basket is on the form, whereby the blanks for another basket may be deposited on the die while it is removed from the form, means for finishing the uncompleted basket on the form and means for then applying a band to and about the form, both operating during the lateral excursion of the die.

8. In a machine for making baskets, the combination of blank-bending mechanism comprising a form and die, means for moving the die laterally away from the form and then returning it, means for depositing the blanks crossed at right angles upon or opposite the die while so removed from the form and means for then applying and wrapping a band about the form, means for actuating the forming mechanism to fold the blanks about the form, and means for completing and nailing the basket while upon the form.

9. In a machine for making baskets, the combination of bending mechanism comprising a form and die, means for moving the die laterally away from the form and then returning it, band-feeding mechanism for applying a band to the form while the die is away, means for then wrapping the band about the form and for subsequently further wrapping it to complete the basket, means for depositing the blanks on or opposite the die while away from the form, means for actuating the bending mechanism to fold the blanks upon the form and over the band thereon, and mechanism for nailing the band after it is further wrapped about the form outside the blanks.

10. In a basket-making machine, the combination of an axially-movable intermittently-rotative form, a rotative laterally-movable die, and their actuating mechanism, whereby the die is moved laterally away from the form, the form at the same time rotated, the die returned opposite the form, the form moved into the die and then rotated with the die.

11. In a basket-making machine, the combination of an axially-movable intermittently-rotative form, a rotative laterally-movable die, and their actuating mechanism, whereby the die is moved laterally away from the form, the form at the same time rotated, the die returned opposite the form, the form moved into the die and then rotated with the die, the die again moved away from the form, the form further rotated, and finally the form again raised.

12. In a basket-making machine, the combination of an axially-movable intermittently-rotative form, a rotative laterally-movable die having a movable or yielding side, and their actuating mechanism, whereby the die is moved laterally away from the form, the form at the same time rotated, the die returned opposite the form, the form moved into the die and then rotated with the die, the die again moved away from the form, the form further rotated and finally the form again raised.

13. In a basket-making machine the combination of an axially-movable intermittently-rotative form, a rotative and laterally-movable die and a band-applying mechanism, and their actuating mechanisms whereby the die is moved laterally away from the form to then receive the blanks, the band automatically applied to the form and the form rotated to wrap the band about it, the die returned opposite the form, the form moved into the die to bend the blanks about it and upon the band thereon, and the form then further rotated to wrap the band about the outer edges of the blanks.

14. In a basket-making machine the combination of an axially-movable intermittently-rotative form, a rotative and laterally-movable die, a band-applying mechanism and a band-nailing mechanism, and their actuating mechanism whereby the die is moved laterally away from the form to receive the blanks, a band applied to the form and the form rotated to wrap the band about it, the die returned opposite the form, the form moved into the die to fold the blanks about it and upon the band thereon, and the form further rotated to wrap the band about the outer edges of the blanks, and the nailing mechanism actuated to nail the band.

15. In a basket-making machine the combination with an axially-movable intermittently-rotative form, a rotative and laterally-movable die and automatic blank-feeding mechanism, and their actuating mechanism, whereby the die is moved laterally away from the form, the blanks then automatically fed thereto, the form at the same time rotated, the die returned opposite the form, the form moved into the die and then rotated with the die.

16. In a basket-making machine the combination with an axially-movable intermittently-rotative form, a rotative and laterally-movable die and automatic blank-feeding mechanism, and their actuating mechanism, whereby the die is moved laterally away from the form, the blanks then automatically fed thereto, the form at the same time rotated, the die returned opposite the form, the form moved into the die and then rotated with the die, the die again moved away from the form, the form further rotated and finally the form again withdrawn to its initial position.

17. In a basket-making machine the combination of an axially-movable intermittently-rotative form, the rotative and laterally-movable die, automatic blank-feeding mechanism and automatic band-feeding mechanism, and their actuating mechanism, whereby the die is moved laterally away from the form, the blanks automatically fed thereto, a band applied to the form and the form rotated to wrap the band about it, the die returned opposite the form, the form moved into the die to fold the blanks about it and upon the band thereon, the form further rotated with the die and the form finally withdrawn to its initial position.

18. In a basket-making machine the combination of an axially-movable intermittently-rotative form, a rotative and laterally-movable die, automatic blank-feeding mechanism, automatic band-feeding mechanism and automatic nailing mechanism, and their actuating mechanism, whereby the die is moved laterally away from the form, the blanks automatically fed thereto, a band automatically applied to the form, the form rotated to wrap the band about it, the die returned opposite the form, the form moved into the die to fold the blanks about it and upon the band thereon, the die and form rotated, the nailing mechanism actuated to nail the band, and finally the form withdrawn to its initial position.

19. In a basket-making machine the combination with the form and laterally-movable die, of the blank-pickers and the wipers or hammers for stripping the blanks from the pickers and depositing them upon the die while away from the form.

20. In a basket-making machine, the combination with the axially-movable form and laterally-movable die, of the blank-pickers and the wipers or hammers for stripping the blanks from the pickers and depositing them upon the die while away from the form.

21. In a basket-making machine the combination with the form, of a laterally-movable die-carrier, a die mounted to rotate therein and having a yielding side normally urged into an upright position by a spring, but yielding as the die leaves the form, a locking device for locking the die and carrier together while away from the form and a tripping device for releasing the lock when the die is returned to the form.

22. In a basket-making machine the combination of the axially-movable intermittently-rotative form, the laterally-movable die having a spring-sustained hinged or swinging side that yields when the die is away from the form, and means for positively raising the side of the die into its upright position when the die and form are rotating in coöperative relation in the formation of the basket.

23. In a basket-making machine the combination of the axially-movable intermittently-rotative form, a laterally-movable die-carrier, the die rotatively mounted therein and having a hinged or folding side and a flange or projection on the die-carrier that raises said side when the form and die are rotated together in the formation of the basket.

24. In a basket-making machine the combination of the axially-movable intermittently-rotative form, a laterally-movable die-carrier, a die mounted to rotate therein and having a hinged or swinging side, a spring applied to said side and normally urging it upward, a locking device that secures the die and carrier together when the die moves laterally away from the form, a tripping device for releasing the lock when the form subsequently enters the die, and means for positively raising the side into its uppermost position when the form and die are rotated in coöperative relation in the formation of the basket.

25. In a basket-making machine the combination of the form, the laterally-movable die that leaves the form with a basket in process of completion thereon, a laterally-movable bottom-nailer and its actuating mechanism whereby the nailer is moved into position beneath the form and a nail driven into the bottom of the basket while the die is away from the form.

26. In a basket-making machine, the combination of the axially-movable intermittently-rotative form, the laterally-movable rotative die that leaves the form with a basket in process of completion thereon, a bottom-nailer and its actuating mechanism, whereby a nail is driven into the bottom of the basket while the die is away from the form.

27. In a basket-making machine, the combination of the axially-movable intermittently-rotative form, the laterally-movable rotative die that leaves the form while a basket is in process of completion thereon, a laterally-movable basket-receiver in which the completed basket is deposited by the form, a laterally-movable bottom-nailer, and actuating mechanism, whereby as the receiver is moved from opposite the form the nailer is moved opposite the form, a nail driven into the bottom of the basket, the nailer moved away and the receiver again brought into position to have the completed basket deposited therein.

28. In a basket-making machine, the combination of the axially-movable intermittently-rotative form, the laterally-movable rotative die that leaves the form while a basket is in process of completion thereon, a laterally-movable basket-receiver in which the completed basket is deposited by the form, a bottom-nailer mounted upon the side of the basket-receiver, and actuating mechanism for said parts.

29. In a basket-making machine, the combination with a form, of a laterally-movable die, two blank-hoppers arranged at an angle to each other and over which the die moves, pickers for lifting blanks from said hoppers, and means for discharging the blanks from the pickers upon the die.

30. In a basket-making machine, the combination with a form, of a die movable laterally in a right line, two blank-hoppers arranged at right angles to each other and over which the die moves, pickers for lifting blanks from said hoppers, and means for discharging the blanks from the pickers upon the die.

31. In a basket-making machine, the combination with the axially-movable intermittently-rotative form, the laterally-movable rotative die, two blank-hoppers arranged at an angle to each other, pickers for lifting blanks from the hoppers and between which and the hoppers the die passes, and means for discharging the blanks from the pickers and upon the die.

32. In a basket-making machine, the combination with the axially-movable intermittently-rotative form, the laterally-movable rotative die, two blank-hoppers arranged at an angle to each other, pickers for lifting blanks from the hoppers and between which and the hoppers the die passes, means for discharging the blank from the picker farthest removed from the form while the die is at the limit of its excursion from the form, and means for discharging the other blank from its picker as the die passes under it.

33. In a basket-making machine the combination of a vertically-reciprocating form, a laterally-movable die and a curved basket-receiving chute in which the baskets are deposited by the form and which delivers the nested baskets laterally to the base of the machine.

34. In a basket-making machine, the combination of an axially-movable intermittently-rotative form, a rotative laterally-movable die, and their actuating mechanism, whereby the die is moved laterally away from the form to receive the blank, and the form is rotated while the die is so removed through three-fourths of a revolution to wrap a band which has been applied to one side around the remaining three sides of the form, the die is then returned opposite the form, the form is then caused to move axially into the die to fold the blanks about it, and is thereafter successively partially rotated while the band is wrapped and nailed and further moved axially after the die has moved laterally away from it to deposit the basket in a receiver.

35. In a basket-making machine, a flanged picker-head having pickers or needles extending through the flange and supported in a ring loosely surrounding the body of the head, a nut applied to the threaded body below the ring and a nut applied to it above the ring whereby the projection of the needles from the head may be adjusted.

36. In a basket-making machine the combination of the vertically-reciprocating needle-heads, weights applied thereto and operating mechanism which drops the needle-heads quickly and raises them less quickly.

37. In a basket-making machine the combination of the vertically-reciprocating needle-heads, adjustable weights applied thereto and operating mechanism which drops the needle-heads quickly and raises them less quickly.

38. In a basket-making machine, the combination of the vertically-movable picker-heads, weight cups or receptacles thereon and mechanism permitting the picker-heads to fall rapidly and for lifting them at a slower rate of speed.

39. In a basket-making machine the combination with a rotatable form, of band-feeding mechanism for delivering a band to one side of the form comprising a notched or bifurcated follower or arm that straddles the edge of a band being delivered to the form and presses it into position on the form.

40. In a basket-making machine the combination with a rotatable form, of band-feeding mechanism for delivering a band to one side of the form comprising a notched or bifurcated follower or arm that straddles the edge of a band being delivered to the form and presses it into position on the form, and a tension device in which the projecting band lies while being wrapped around the form.

41. In a basket-making machine the combination with a rotatable form, of band-feeding mechanism for delivering a band to one side of the form comprising a notched or bifurcated follower or arm that straddles the edge of a band being delivered to the form and presses it into position on the form, a tension device in which the projecting band lies while being wrapped around the form, and a guide for holding the band in proper relation to the form as the form rotates to wrap the band around it.

42. In a basket-making machine the combination with a rotatable form, of band-feeding mechanism for delivering a band to one side of the form comprising a notched or bifurcated follower or arm that straddles the edge of a band being delivered to the form and presses it into position on the form, and an adjustable tension device in which the projecting band lies while being wrapped around the form.

43. In a basket-making machine, the combination of a rotatable form having a projection, hook or catch at one side to receive a band applied thereto, band feeding and applying mechanism for so applying the band, a guide for holding the band in proper relation to the form and the pivoted tension device acting upon the band while the form rotates to wrap the band about it.

44. In a basket-making machine the combination of a rotatable form having a projection, hook or catch to receive a band applied thereto, band feeding and applying mechanism comprising a follower notched or bifurcated at its lower end to straddle the upper edge of a band being applied to the form and press it into position, and a pivoted tension device into which the lower edge of the band is at the same time pressed or delivered, the band being held and guided by the follower and the tension device as the form rotates to wrap the band about it.

45. In a basket-making machine the combination with the rotatable form, of a band-feeding mechanism for separating and delivering the bands toward the form, a tension device having jaws or bifurcations into which the band is delivered and a swinging follower notched at its end to straddle the band and press it into position with reference to the form and into the jaws of the tension device.

46. In a basket-making machine the combination with the rotatable form, of a band-feed mechanism for separating and delivering the bands toward the form, a tension device having jaws or bifurcations into which the band is delivered and a swinging follower notched at its end to straddle the band and press it into position with reference to the form and into the jaws of the tension device and a guide for holding the band in position relatively to the form while the form rotates to wrap the band about it.

47. In a basket-making machine, the combination of the rotative form, a hook projecting from the side thereof and adapted to receive a band delivered to the form, means for holding the jaw of the hook away from the side of the form to permit the free entrance of the band when the form is in its initial position, and means tending to draw the jaw of the hook toward the form to clamp the band when the form rotates to wrap the band about it.

48. In a basket-making machine, a hook projecting from the side of the form to receive a band delivered thereto, means whereby the hook is rotated to turn the jaw of the hook downward when the completed basket is being stripped from the form and for then returning the hook to its initial position to receive the next band.

49. In a basket-making machine, a form, a hook projecting from the side thereof, a spring normally tending to draw the hook toward the side of the form, means for overcoming the tension of the spring and pressing the hook away from the side of the form while the form is in its initial position but which permits the spring to draw the hook toward the form to clamp a band when the form commences to rotate.

50. In a basket-making machine, a form, a hook projecting from the side thereof, a spring normally tending to draw the hook toward the side of the form, means for overcoming the tension of the spring and pressing the hook away from the side of the form while the form is in its initial position but which permits the spring to draw the hook toward the form to clamp a band when the form commences to rotate, means for turning the jaw of the hook downwardly to permit the stripping of a completed basket from the form and for then returning the hook to its normal position.

51. In a basket-making machine, the combination of an axially-movable rotative form, a laterally-movable die, means for delivering the band to one side of the form, means for rotating the form through three-fourths of a revolution to wrap the band about the remaining three sides thereof, means for then advancing the form into the die to fold the blanks about it, means for then rotating the form through three-fourths of a revolution, a nailer then actuated to nail the band at one side of the basket and means for then successively rotating the basket through one-fourth of a revolution at each step, the side of the basket being nailed after each fourth of a revolution.

In testimony whereof I have hereunto subscribed my name.

EMMET HORTON.

Witnesses:
W. M. UFFORD,
E. E. STANCHIFF.